March 3, 1942.  G. B. HAGEN  2,275,296
RADIO DIRECTION FINDER
Filed Feb. 7, 1939
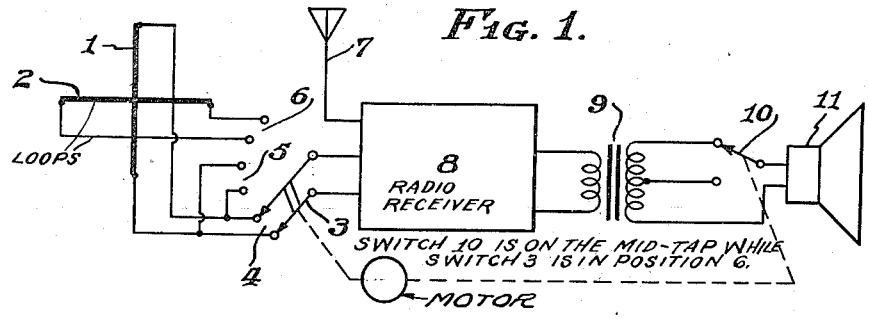
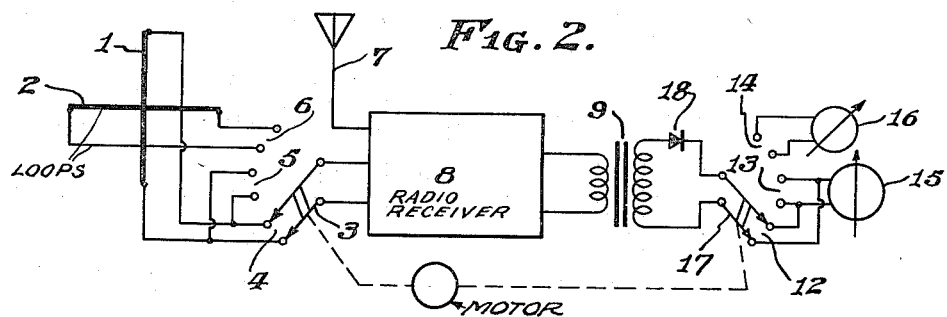
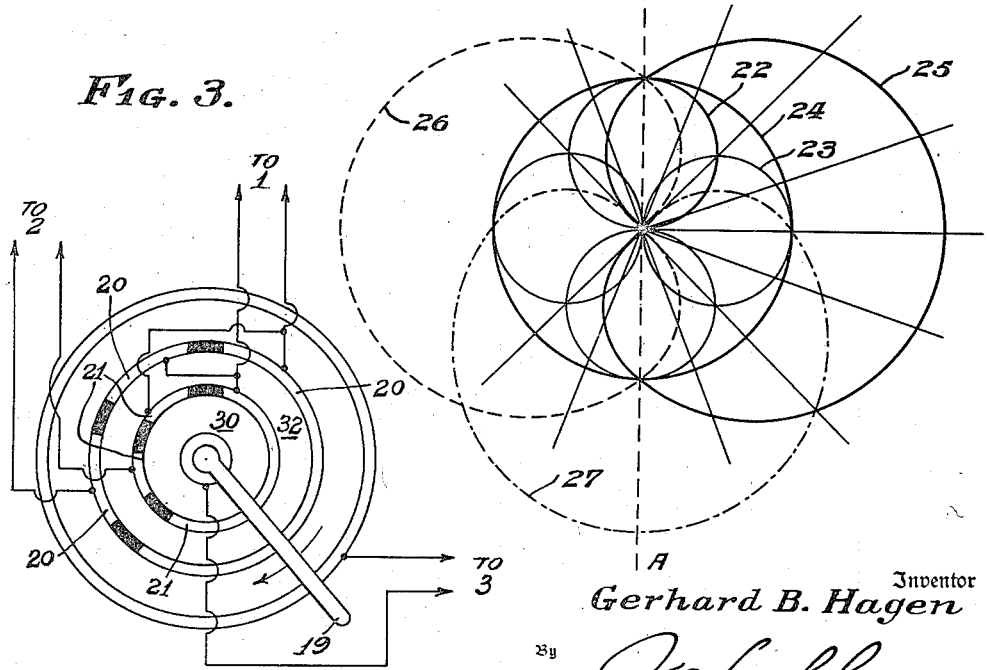
Inventor
Gerhard B. Hagen
By
Attorney Patented Mar. 3, 1942

2,275,296

UNITED STATES PATENT OFFICE 2,275,296

RADIO DIRECTION FINDER

Gerhard B. Hagen, Berlin, Germany, assignor to Telefunken Gesellschaft für Drahtlose Telegraphie m. b. H., Berlin, Germany, a corporation of Germany Application February 7, 1939, Serial No. 254,994
In Germany February 7, 1938

1 Claim. (Cl. 250—11)

This invention relates to a direction finder, especially to a so-called "flicker"-type direction finder. In such direction finders two or more directive receiving characteristics are produced by periodically switching the antenna circuits.

The flicker direction finder operates essentially as follows: When the receiving loop is in the proper direction-finding position, constant amplitude signals are received. When the receiving loop is turned out of this position, flicker reception takes place, i. e., amplitude of the received signal fluctuates periodically. Such periodic variations of the received signal are obtained by coupling a suitably tuned aerial circuit with a loop whose polarity is varied periodically at the desired rate. The periodic coupling of the loop or the aerial circuit is preferably altered at such rhythm or rate that it will be possible to tell by the sound of the received signal whether there has been a drift to the right or to the left-hand side of the proper course. It is particularly advantageous to cause such change in coupling at the rhythm of complementary telegraphic signals so that the proper course will be indicated by an uninterrupted dash, while course departures are indicated by a predominating signal, for example, A or N. Additional to this course indication, it is necessary to determine whether the receiver is approaching or passing away from the transmitter. This determination may be made by turning the loop out of zero reception and observing whether the indicator shows a course departure corresponding to the loop movement or opposite thereto. This determination is not always free from errors, which are an immense danger for the air traffic.

According to the present invention, the arrangement for the course indication is combined with an arrangement for determining automatically whether the transmitter is fore or aft of the aircraft. For this reason, I have built a switching arrangement for the frame or aerial circuit, which gives periodically after a switching period for the course indication a period for the fore or aft determination. The switching device includes three switch positions: In the first two switch positions the two conventional diagrams for the course indication are produced; in the third position a diagram is produced, which identifies the fore or aft position of the transmitter. In the last switching position, a diagram may be produced which (by way of example) has its maximum reception ahead of the craft carrying the device, and its minimum behind the craft so that the fore and aft bearings may be distinguished.

An arrangement of this kind shall be described with reference to the drawing in which Figure 1 is a schematic circuit diagram of one embodiment of the invention; Figure 2 is a schematic circuit diagram of a modification; Figure 3 is an elevational view of the switching means; and Figure 4 is a graph of the several directive patterns. In the several figures, similar reference numerals will be used to indicate similar elements.

According to Fig. 1, the aerial system consists of two crossed loops 1 and 2 and a nondirectional antenna 7. A switch 3 is connected to the input of the radio receiver 8. The switch has three different positions 4, 5 and 6. In the first switch position 4, loop 1 which is arranged at right angles to the proper course, is coupled to the input circuit of the receiver. In the second switch position 5, the same loop 1 is coupled to the receiver input circuit, but with reversed phase. In the third switch position 6, the second loop 2, which is arranged in the direction of the proper course, is coupled to the input circuit of the receiver 8. In combination with the nondirectional antenna 7 in both first switch positions, cardioid patterns are produced. Constant volume reception is obtained in the direction of equal energy of both patterns, as indicated by the intersection of the cardioids 25, 26 of Fig. 4.

In switch position 6, in combination with the coupled nondirectional antenna 7, a cardioid pattern is also produced, but that pattern is turned about 90 degrees to the aforesaid patterns. In Fig. 1, in which means are represented for aural signals only, a transformer 9 is arranged in the output circuit of the receiver. The secondary of the transformer has a midtap. By means of the switch 10 in switch positions 4 and 5, the entire secondary voltage is applied to the telephones or other aural signal indicator 11. In the position 6 of the switch 3, the switch 10 is connected to the midtap so that only the half of the voltage produced on the secondary of the transformer 9 is applied to the aural signal indicator 11.

For the purpose of explanation, reference is made to the field patterns shown in Fig. 4. The cardioid diagram 25 is obtained by combining the receiving pattern 23 of loop 1 with the pattern 24 of aerial 7. This corresponds to position 4 of switch 3. In the same manner, the diagram 26 may be obtained in switch position 5. The intersection of the patterns 24—25 is the course line, A, B. For the purpose of discrimination of both directions A and B, the receiving pattern 22 of loop 2 is combined with pattern 24 of the nondirectional antenna 7. The resulting pattern is cardioid diagram 27, the maximum of which is along direction A and the minimum along direction B. It may be seen that the vector of the diagram 27 in the direction A has twice the value of the vectors of either diagrams 25 and 26 in the same direction. Thus, because of the output circuit switching arrangement, the receiver output amplitude corresponding to the course indication is made equal to the amplitude corresponding to the desired fore or aft indication, and a uniform signal will be obtained in the three positions 4, 5, 6 of switch 3, when the receiver moves along the course B, A in the direction of A.

The circuit may be used with a visual indicator as shown in Fig. 2. The current produced in the secondary of the transformer 9 is applied to a rectifier 18. The rectified current is impressed through the first and second positions 12 and 13 of the switch 17 (corresponding respectively to the positions 4 and 5 of the antenna switch 3) upon the instrument 15. In the third position 14 of the switch 17, the rectified current is applied to another instrument 16. This instrument 16 is used to determine the fore or aft position of the transmitter. The third position 14 of the switch 17 corresponds to the third position 6 of the antenna switch 3.

By way of example, one section of a suitable rotary switch arrangement is shown in Fig. 3. The switch consists of two rings 30, 32, arranged concentric to one another. Each ring has three contact segments. Each of the switch positions corresponding to switch positions 4, 5 and 6 possesses a pair of contact segments 20 and 21. The movable contact is a rotating brush 19, which has also two contacts. The contacts are insulated and connected by any suitable means to the input of the receiver 8. The output switch 17 is arranged in a similar manner.

The switch 3 may be operated in accordance with complementary Morse signals $e-t$. When both received signals $e$ and $t$ have the same amplitude, the pilot is on the proper course. If an additional $e$ signal is received with the same amplitude on switch position 6 of Fig. 1, the craft carrying the device is on the proper course and the transmitter is in front. Of course, a method in any other rhythm may be proposed. But it is necessary to choose a short sign for switch position 6. Thereby it is possible to obtain a proper visual right-left indication and a proper indication of the side of the transmitter. According to Fig. 2, the switch 17 is switched from instrument 15 to instrument 16 on switch positions 6 and 14. If the switching from the meter 15 results in any change of its indication, such effect may be compensated for by applying a suitable compensating current.

While I have shown and described my invention in certain specific embodiments, it will of course be understood that I do not wish to be limited thereto. It is possible to provide other known antenna systems for the course indication, such as an Adcock system. In the specific embodiment, the course indication has been produced by the cardioid patterns obtained periodically in the first two switch positions, and in the third switch position the pattern for the fore and aft determination is produced. The switching may be also arranged so that one switch position for fore and aft determination is followed by five switching positions for course indication. The rotating switch must then be built in such manner that five segments $e-t$ are followed by one segment $e$.

Having thus described my invention and the operation thereof, what I claim is:

A radio direction finder including in combination a directive antenna, a second directive antenna angularly disposed with respect to said first antenna, a nondirectional antenna, a radio receiver having input and output circuits, switching means including said radio receiver for combining in successive order the currents of one of said directive antennas with the currents of said nondirectional antenna to produce a pair of antenna patterns whose intersections indicate a course and for combining the currents of the other of said directive antennas with the currents of said nondirective antenna to produce a third antenna pattern to indicate the fore or aft position of the transmitter establishing the course, means connecting the input circuit of said radio receiver to said switching means, means including a second switching means connected to the output of said receiver, means for continuously operating said first and second switching means continuously and in synchronism, and a pair of visual indicators connected to said second switching means for indicating successively and automatically said course and fore or aft position.

GERHARD B. HAGEN.